US012755658B2

(12) United States Patent
Choi et al.

(10) Patent No.: US 12,755,658 B2
(45) Date of Patent: Oct. 6, 2026

(54) DISPLAY DEVICE AND DRIVING METHOD THEREOF

(71) Applicant: LG Display Co., Ltd., Seoul (KR)

(72) Inventors: Jinsol Choi, Paju-si (KR); Mookyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 131 days.

(21) Appl. No.: 18/497,870

(22) Filed: Oct. 30, 2023

(65) Prior Publication Data

US 2024/0257680 A1 Aug. 1, 2024

(30) Foreign Application Priority Data

Jan. 31, 2023 (KR) ........................ 10-2023-0012227

(51) Int. Cl.
*G09G 3/00* (2006.01)
*G09G 3/20* (2006.01)
(Continued)

(52) U.S. Cl.
CPC ........... *G09G 3/006* (2013.01); *G09G 3/2096* (2013.01); *G09G 3/3233* (2013.01);
(Continued)

(58) Field of Classification Search
CPC .... G09G 3/3233; G09G 3/3291; G09G 3/006; G09G 3/2096; G09G 2300/0819; G09G 2300/0842; G09G 2320/046; G09G 2330/10; G09G 2330/028; G09G 2330/12; G09G 3/2074; G09G 3/3208; G09G 3/3266; G09G 3/3275; G09G 2310/08;
(Continued)

(56) References Cited

U.S. PATENT DOCUMENTS

| | | | | |
|---|---|---|---|---|
| 11,350,528 | B2 | 5/2022 | Pyun et al. | |
| 11,996,052 | B2 * | 5/2024 | Hong | G11C 19/28 |

(Continued)

FOREIGN PATENT DOCUMENTS

| | | | |
|---|---|---|---|
| JP | 2019012256 | A | 1/2019 |
| JP | 2020024413 | A | 2/2020 |

(Continued)

OTHER PUBLICATIONS

English Translation of KR 20200005347-A, 32 pages (Year: 2025).*
English Translation of KR 20220060133-A, 19 pages (Year: 2025).*

*Primary Examiner* — Jimmy H Nguyen
(74) *Attorney, Agent, or Firm* — Seed Intellectual Property Law Group LLP

(57) ABSTRACT

Aspects relate to a display device and driving method thereof. A display device includes a display panel including a sub-pixel and displaying an image in units of frames, a data driver including a driving circuitry applying data voltage to the sub-pixel during an active time displaying an image
(Continued)

within one frame and a sensing circuitry sensing the sub-pixel during the active time, and a timing controller detecting a defect of the display panel based on a sensing result of the sensing circuitry, wherein the frame includes an active time for display the image and a blank time for sensing a characteristic value of the sub-pixel, and the timing controller turns on the sampling switch at least one time during the active time.

18 Claims, 12 Drawing Sheets

(51) Int. Cl.
*G09G 3/3233* (2016.01)
*G09G 3/3291* (2016.01)

(52) U.S. Cl.
CPC ... *G09G 3/3291* (2013.01); *G09G 2300/0819* (2013.01); *G09G 2300/0842* (2013.01); *G09G 2320/046* (2013.01); *G09G 2330/028* (2013.01); *G09G 2330/10* (2013.01); *G09G 2330/12* (2013.01)

(58) Field of Classification Search
CPC ... G09G 2310/0243; G09G 2310/0264; G09G 2320/02; G09G 2320/04; G09G 2330/04; G09G 2330/045
USPC .................................................... 345/212, 76
See application file for complete search history.

(56) References Cited

U.S. PATENT DOCUMENTS

| | | | | |
|---|---|---|---|---|
| 2015/0187268 | A1 | 7/2015 | Tani et al. | |
| 2018/0061295 | A1* | 3/2018 | Hong | G09G 3/006 |
| 2019/0058029 | A1 | 2/2019 | Woo et al. | |
| 2019/0189038 | A1 | 6/2019 | Park | |
| 2022/0375413 | A1 | 11/2022 | Pyun et al. | |

FOREIGN PATENT DOCUMENTS

| | | | | | |
|---|---|---|---|---|---|
| JP | 2022503271 | A | | 1/2022 | |
| JP | 2022105277 | A | | 7/2022 | |
| KR | 20160090463 | A | | 8/2016 | |
| KR | 10-2017-0081100 | A | | 7/2017 | |
| KR | 20200005347 | A | * | 1/2020 | G09G 3/3233 |
| KR | 20220058686 | A | | 5/2022 | |
| KR | 20220060133 | A | * | 5/2022 | G09G 3/3266 |

* cited by examiner

DISPLAY DEVICE AND DRIVING METHOD THEREOF

CROSS REFERENCE TO RELATED APPLICATION

The present application claims priority to Korean Patent Application No. 10-2023-0012227, filed on Jan. 31, 2023, the entire contents of which is incorporated herein for all purposes by this reference.

BACKGROUND

Technical Field

The present disclosure relates to a display device and driving method thereof.

Description of the Related Art

Recently, display devices utilizing self-emitting organic light-emitting diodes (OLEDs) have been gaining attention due to their advantages such as fast response time, high luminous efficiency, brightness, and wide viewing angles.

These display devices array sub-pixels, consisting of organic light-emitting diodes (OLEDs) and driving transistors, in a matrix format on the display panel and control the brightness of sub-pixels selected through scan signals based on the gradation of the data.

These display devices have various signal lines and signal transmission structures to facilitate their operation.

When defects such as open or short circuits in signal lines, and issues with the connection and bonding of signal transmission structures, occur, these display devices may experience a panel burnt phenomenon, which is characterized by abnormal operation and damage to the display panel. Ultimately, the display devices encounter severe defects and, in extreme cases, even lead to fires.

Therefore, the defects that lead to the panel burnt phenomenon are proactively detected before the occurrence of the panel burnt phenomenon. In addition, it is beneficial to accurately identify and efficiently manage the detected defects that can cause the panel burnt phenomenon. Through such management, immediate and appropriate measures can be taken in response to the occurrence of defects.

BRIEF SUMMARY

Aspects provide a display device and driving method thereof that are capable of detecting defects such as panel burnt during the display driving of an image.

Aspects provide a display device and driving method thereof that are capable of reducing the processing time of real-time sensing processes.

Aspects provide a display device and driving method thereof that are capable of detecting panel burnt phenomenon within the active time of one frame during the display driving.

A display device according to an aspect includes a display panel including a sub-pixel and displaying an image in units of frames, a data driver including a driving circuitry applying data voltage to the sub-pixel during an active time displaying an image within one frame and a sensing circuitry sensing the sub-pixel during the active time, and a timing controller detecting a defect of the display panel based on a sensing result of the sensing circuitry.

The frame may include an active time for displaying the image and a blank time for sensing a characteristic value of the sub-pixel, and the timing controller turns on the sampling switch at least once during the active time.

The sensing circuitry may include a sampling circuit sampling an electrical signal sensed upon the sampling switch being turned on as sensing voltage, and an analog-to-digital converter outputting digital data converted from the sensing voltage.

The sensing circuitry may further include a line capacitor storing the sensing voltage sampled during the active time, and the analog-to-digital converter may convert the sensing voltage stored in the line capacitor to the digital data during a blank time following the active time.

The display device may further include a comparator comparing the sensing voltage with a predetermined or selected target voltage.

The target voltage may be determined in correspondence to the data voltage applied during the active time.

The comparator may be provided within the timing controller or the sensing circuitry.

The comparator compares the sensing voltage with the predetermined or selected target voltage and outputs a lock signal based on a difference between the sensing voltage and the predetermined or selected target voltage greater than a threshold value.

The sensing circuitry further may include the comparator and an OR gate configured to receive a lock signal output from the comparator and a second lock signal generated based on a defect being detected in the display panel.

The timing controller may provide video data compensated based on a characteristic value of the sub-pixel sensed during a blank time following the active time to the driving circuitry.

The display device may further include a power controller applying reference voltage to the sub-pixel and a gate driver applying a scan signal and a sensing signal to the sub-pixel.

The active time may include a first period during which the scan signal and the sensing signal at a turn-on level and the data voltage and reference display voltage are applied to the sub-pixel, a second period during which the application of the reference display voltage is interrupted, and a third period during which the scan signal and the sensing signal at a turn-off level are applied to the sub-pixel and the sampling switch is turned on.

A driving method of a display device according to an aspect drives the display device including a display panel including a sub-pixel, a data driver including a driving circuitry applying data voltage to the sub-pixel and a sensing circuitry sensing an electrical signal output from the sub-pixel, and a sampling switch switching a connection between the sub-pixel and the sensing circuitry.

The method may include programming the data voltage to the sub-pixel during an active time of a frame, and sampling the electrical signal output from the sub-pixel as sensing voltage by turning on the sampling switch during the active time.

The method may further include sensing a characteristic value of the sub-pixel during a blank time following the active time and providing video data compensated based on the characteristic value to the driving circuitry.

The method may further include storing, by the sensing circuitry, the sampled sensing voltage in a line capacitor of the sensing circuitry during the active time, and converting, by the sensing circuitry, the sampled sensing voltage stored in the sensing circuitry into digital data during a blank time following the active time.

The method may further include comparing the sensing voltage with a predetermined or selected target voltage; and outputting a lock signal based on a difference between the sensing voltage and the predetermined or selected target voltage being greater than a threshold value.

The target voltage may be determined in correspondence to data voltage applied during the active time.

DETAILED DESCRIPTION

Figure 1:
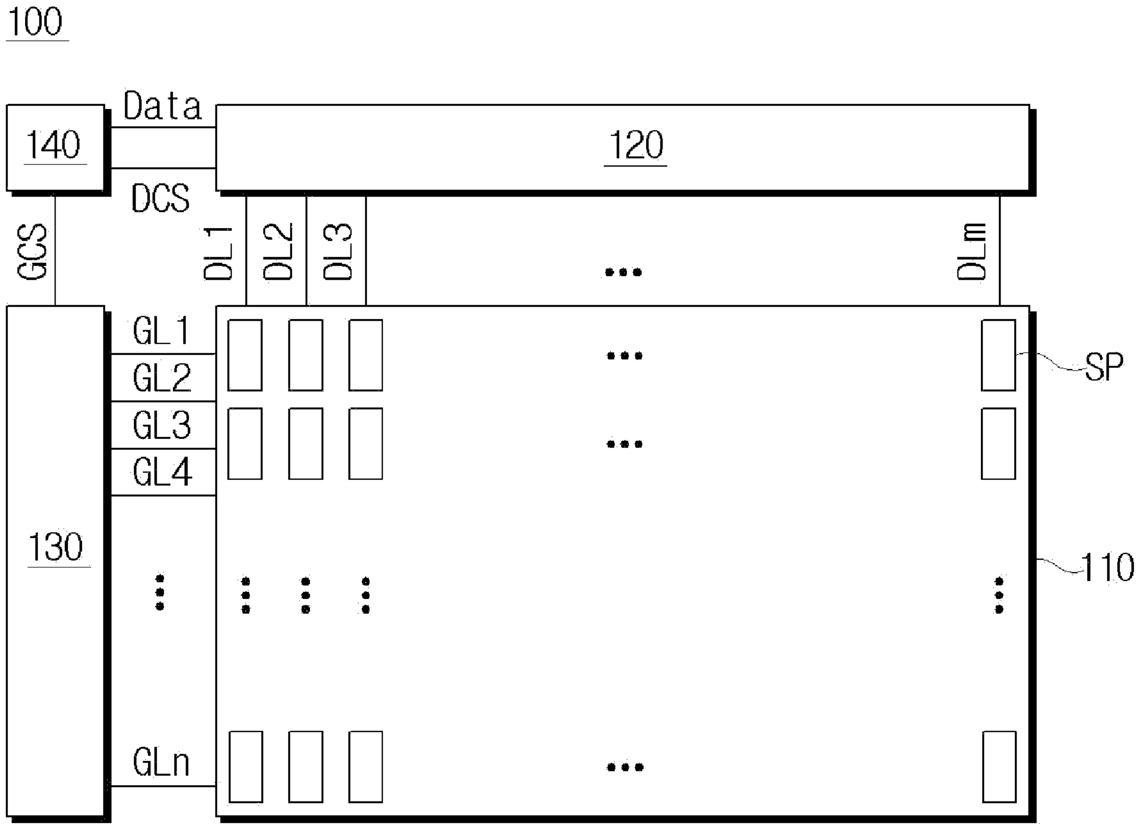
FIG. 1 is a diagram illustrating a system configuration of a display device according to an aspect.

Hereinafter, aspects will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc., are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc., are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a diagram illustrating a system configuration of a display device 100 according to an aspect.

With reference to FIG. 1, the display device 100 according to an aspect includes a display panel 110 having a plurality of sub-pixels SP defined by, or positioned at regions of overlap of, a plurality of data lines DL1 to DLm and a plurality of gate lines GL1 to GLn arranged thereon in the form of a matrix, a data driver 120 driving the plurality of data lines DL1 to DLm, a gate driver 130 driving the plurality of gate lines GL1 to GLn, and a timing controller 140 controlling the data driver 120 and gate driver 130.

The timing controller 140 supplies various control signals to the data driver 120 and gate driver 130 to control the data driver 120 and gate driver 130.

The timing controller 140 initiates scanning based on the timing information for each frame, converts the video data input from the outside into the data signal format used by the data driver 120, outputs the converted video data, and controls the data driving at appropriate times synchronized with the scanning.

The data driver 120 drives the plurality of data lines DL1 to DLm by supplying data voltages to the plurality of data lines DL1 to DLm. The data driver 120 is also referred to as the "source driver." The data driver 120 may include at least one source driver integrated circuit SDIC to drive the plurality of data lines DL1 to DLm.

The gate driver 130 sequentially supplies scanning signals to the plurality of gate lines GL1 to GLn, thereby sequentially driving the gate lines GL1 to GLn. The gate driver 130 is also known as the "scan driver." The gate driver 130 may include at least one gate driver integrated circuit GDIC to drive a plurality of gate lines GL1 to GLn.

Under the control of the timing controller 140, the gate driver 130 sequentially supplies scanning signals of on or off voltages to the plurality of gate lines GL1 to GLn.

When a specific gate line is opened or asserted by the gate driver 130, the data driver 120 converts the video data received from the timing controller 140 into analog data voltages and supplies the analog data voltages to the plurality of data lines DL1 to DLm.

Although the data driver 120 is positioned on only one side (e.g., top or bottom of the display panel 110) in FIG. 1, it may also be positioned on both sides (e.g., top and bottom) of the display panel 110, depending on the driving method and panel design.

Although the gate driver 130 is positioned on only one side (e.g., left or right) of the display panel 110 in FIG. 1, it may also be positioned on both sides (e.g., left and right) of the display panel 110 depending on the driving method and panel design.

The timing controller 140 receives various timing signals including vertical synchronization signals, horizontal synchronization signals, input data enable signals, and clock signals from an external source (e.g., host system), along with input video data.

To control the data driver 120 and gate driver 130, the timing controller 140 generates various control signals based on the timing signals such as vertical sync signals, horizontal sync signals, input data enable (DE) signals, and clock signals, and outputs the generated signals to the data driver 120 and gate driver 130.

For example, the timing controller 140 outputs various gate control signals GCS including gate start pulse, gate shift clock, and gate output enable signals to control the gate driver 130.

The timing controller 140 also outputs various data control signals DCS including source start pulse, source sampling clock, and source output enable signals to control the data driver 120.

Each sub-pixel SP arranged on the display panel 110 may be composed of or include circuit components such as transistors. For example, each sub-pixel SP may be composed of or include circuit components such as an organic light-emitting diode OLED and a driving transistor for driving the organic light-emitting diode OLED. The types and quantities of circuit components constituting or included in each sub-pixel SP may vary depending on the desired functions and design approach.

Figure 2:
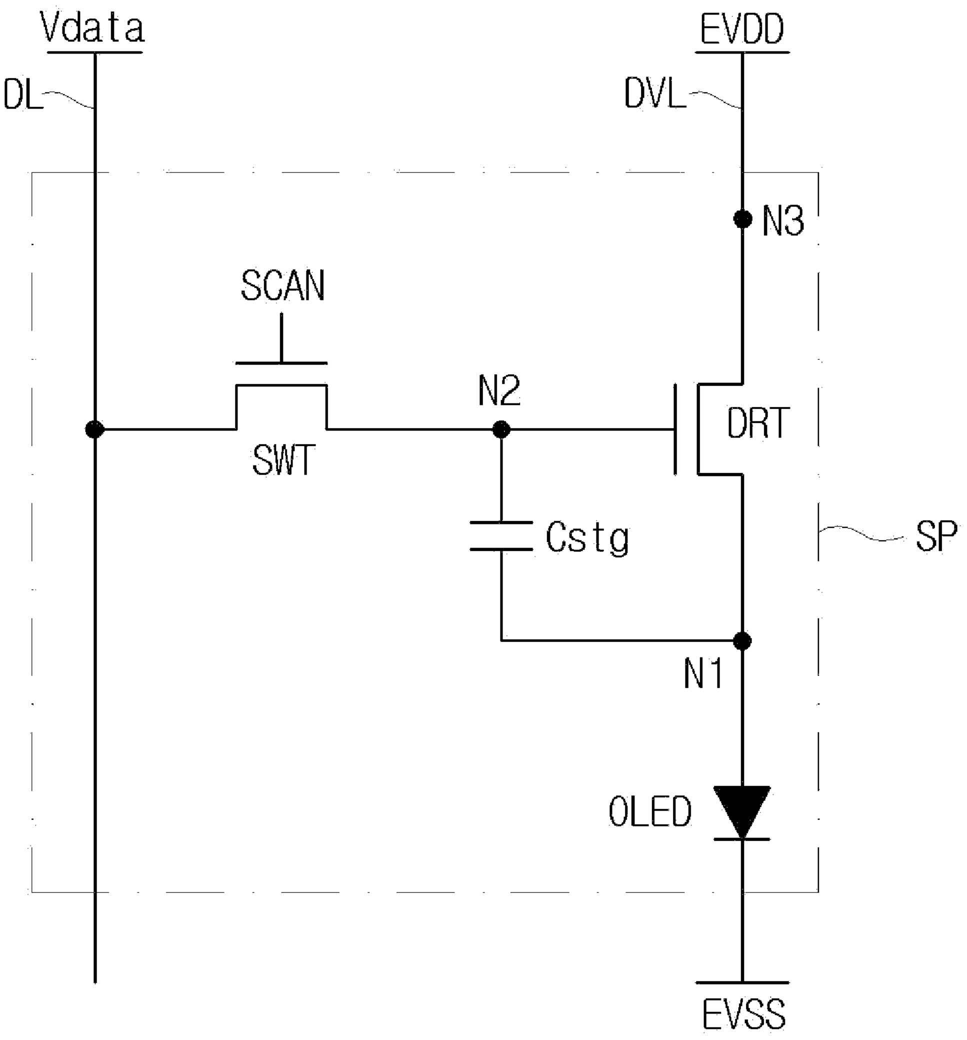
FIG. 2 is a schematic diagram illustrating a sub-pixel of a display device according to an aspect.

FIG. 2 is a schematic diagram illustrating a configuration of a sub-pixel SP of a display device 100 according to an aspect.

With reference to FIG. 2, each sub-pixel of the display device 100 according to an aspect may be configured to include an organic light-emitting diode OLED, a driving transistor DRT that controls driving current applied to the organic light-emitting diode OLED, a switching transistor SWT that transfers data voltage to the gate node of the driving transistor DRT, and a storage capacitor Cstg that maintains the data voltage corresponding to the video signal voltage or the corresponding voltage for one frame duration. Some elements of the sub-pixel may be omitted from view in FIG. 2 for simplicity of illustration.

The organic light-emitting diode OLED may be composed of or include a first electrode (e.g., anode electrode), an organic layer, and a second electrode (e.g., cathode electrode).

The driving transistor DRT drives the organic light-emitting diode OLED by supplying driving current to the organic light-emitting diode OLED. The first node N1 of the driving transistor DRT may be electrically connected to the first electrode of the organic light-emitting diode OLED and may be the source node or the drain node of the driving transistor DRT. The second node N2 may be electrically connected to the source node or the drain node of the switching transistor SWT and may be the gate node of the driving transistor DRT. The third node N3 may be electrically connected to the driving voltage line DVL supplying a high-potential driving voltage EVDD and may be the drain node or the source node of the driving transistor DRT.

The switching transistor SWT is electrically connected between the data line DL and the second node N2 of the driving transistor DRT and may be controlled by a scan signal SCAN applied at the gate node thereof. The switching transistor SWT is turned on by the scan signal SCAN and may transmit the data voltage Vdata supplied through the data line DL to the second node N2 of the driving transistor DRT.

The storage capacitor Cstg may be electrically connected between the first node N1 and the second node N2 of the driving transistor DRT. The storage capacitor Cstg is an external capacitor intentionally designed outside the driving transistor DRT rather than an internal capacitor such as a parasitic capacitor existing between the first node N1 and the second node N2 of the driving transistor DRT.

Meanwhile, in a display device 100 according to an aspect, as the driving time of the sub-pixel SP accumulates (e.g., over the life of the display device 100), the circuit components such as organic light-emitting diodes OLED and the driving transistor DRT may degrade. As a result, the intrinsic characteristic values of the circuit components may change. These characteristic values may include the threshold voltage and mobility of the driving transistor DRT and the threshold voltage of the organic light emitting diode OLED. Such changes in the characteristic values of the circuit components lead to variations in luminance of the corresponding sub-pixels, causing a decrease in the uniformity of luminance in the display panel 110 and deteriorating image quality.

The display device 100 according to an aspect may provide sensing functionality to sense the characteristic values or changes in the characteristic values of the circuit components and compensation functionality to compensate for characteristic value deviations between circuit components based on the sensing results.

Figure 3:
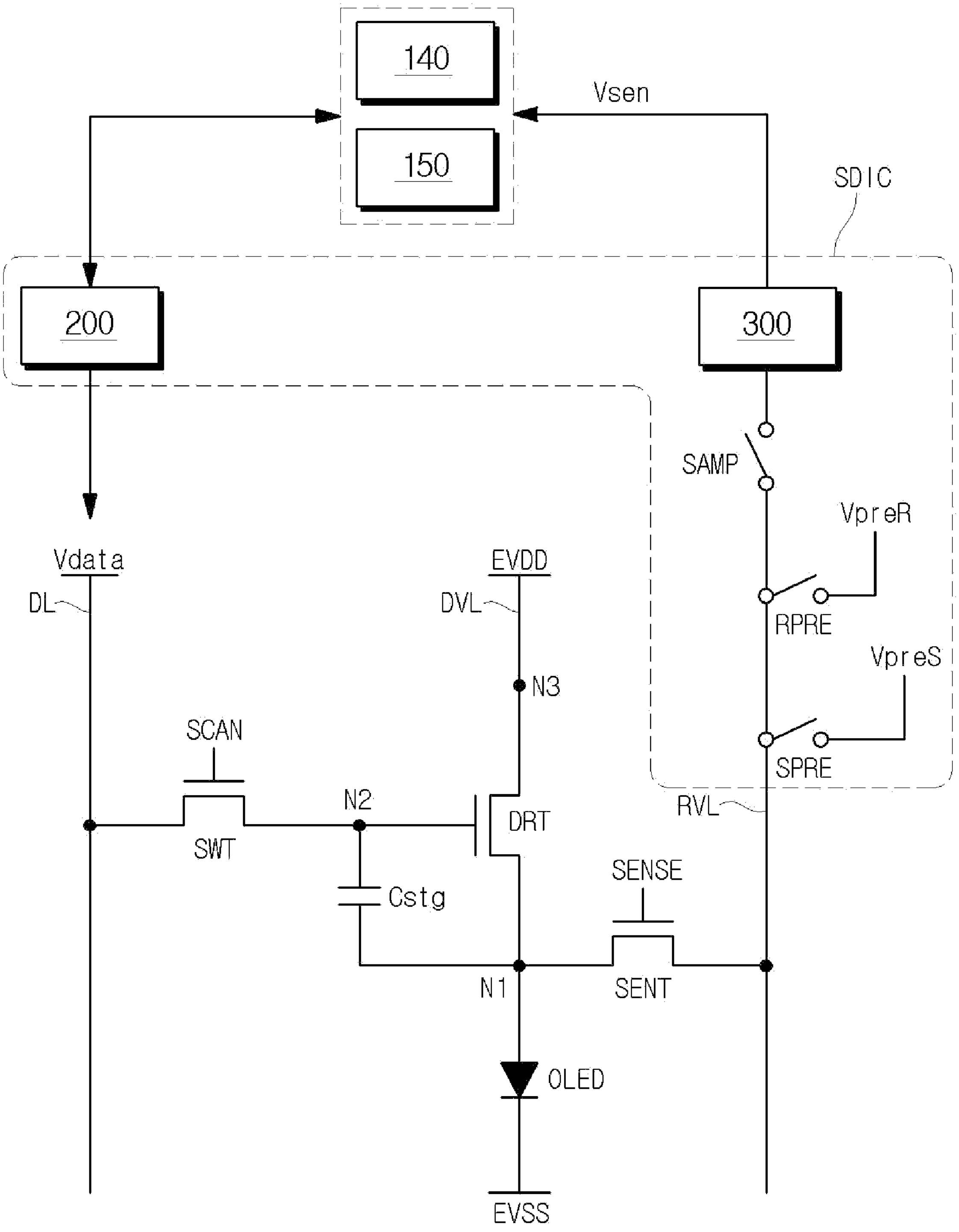
FIG. 3 is a schematic diagram illustrating a sub-pixel configuration and compensation circuity of a display device according to another aspect.

FIG. 3 is a schematic diagram illustrating a sub-pixel configuration and compensation circuity of a display device according to another aspect.

With reference to FIG. 3, each sub-pixel arranged in the display panel 110 according to an aspect may further include a sensing transistor SENT in addition to the organic light emitting diode OLED, the driving transistor DRT, the switching transistor SWT, and the storage capacitor Cstg.

The sensing transistor SENT is electrically connected between the first node N1 of the driving transistor DRT and a reference voltage line RVL and may be controlled by a sensing signal SENSE, which is a type of scan signal, applied to the gate node thereof. The sensing transistor SENT turns on in response to the sensing signal SENSE and applies the reference voltages VpreR and VpreS supplied through the reference voltage line RVL to the first node N1 of the driving transistor DRT. The sensing transistor SENT may also serve as one of the voltage sensing paths for the first node N1 of the driving transistor DRT.

In an aspect, this reference voltage line RVL may be arranged per sub-pixel column or per two or more sub-pixel columns. For example, in the case where one pixel consists of four sub-pixels (red sub-pixel, white sub-pixel, green sub-pixel, blue sub-pixel), the reference voltage line RVL may be arranged with one line per pixel column containing four sub-pixel columns (red sub-pixel column, white sub-pixel column, green sub-pixel column, blue sub-pixel column).

Meanwhile, the scan signal SCAN and the sensing signal SENSE may be separate gate signals. In this case, the scan signal SCAN and the sensing signal SENSE may be applied to the gate nodes of the switching transistor SWT and the sensing transistor SENT, respectively, through different gate lines. In another aspect, the scan signal SCAN and the sensing signal SENSE may be the same gate signal. In this case, the scan signal SCAN and the sensing signal SENSE may be commonly applied to the gate nodes of both the switching transistor SWT and the sensing transistor SENT through the same gate line.

The driving transistor DRT, the switching transistor SWT, and the sensing transistor SENT may each be implemented as an n-type or p-type transistors.

With reference to FIG. 3, the data driver 120 according to an aspect may include a driving circuitry 200 for driving sub-pixels SP and a sensing circuitry 300 for sensing the sub-pixels SP. The driving circuitry 200 may be connected to the data line DL, and the sensing circuitry 300 may be connected to the reference voltage line RVL.

The driving circuitry 200 may output data voltages to drive the sub-pixel SP. The sensing circuitry 300 senses electrical signals (e.g., voltages) reflecting the characteristic values of the sub-pixel (characteristic values of driving transistor DRT and organic light-emitting diode OLED) or changes in the characteristic values, which are outputted from the reference voltage line RVL, converts the sensed electrical signals into digital values, and outputs the converted digital values as sensing data Vsen.

The sensing circuitry 300 may include at least one analog-to-digital converter (ADC) to convert the sensed electrical signals into digital data. Each ADC may be integrated internally within the source driver integrated circuit SDIC. The sensing data Vsen output through the ADC may have a low voltage differential signaling (LVDS) data signal format. The ADC is described in greater detail with reference to FIG. 11 and FIG. 12.

The display device 100 according to an aspect may include a first switch RPRE to control the supply of reference display voltage VpreR (or initialization voltage) to the reference voltage line RVL for controlling sensing operations, a second switch SPRE to control the supply of reference sensing voltage VpreS to the reference voltage line RVL, and a sampling switch SAMP to switch the connection between the reference voltage line RVL and the sensing circuitry 300.

The first switch RPRE controls the connection between the power controller outputting the reference display voltage VpreR during display driving and the reference voltage line RVL. During the display driving, the first switch RPRE is turned on at least once within the active time to supply the reference display voltage VpreR to the reference voltage line RVL. The reference display voltage VpreR supplied to the reference voltage line RVL may be applied to the first node N1 of the driving transistor DRT through the turned-on sensing transistor SENT. When the data voltage Vdata applied to the data line DL is supplied to the second node N2 via the switching transistor SWT, the sub-pixel SP is charged with a voltage corresponding to the data voltage Vdata.

The second switch SPRE controls the connection between the power controller outputting the reference sensing voltage VpreS and the reference voltage line RVL during sensing driving. During the sensing driving, the second switch SPRE is turned on at least once to supply the reference sensing voltage VpreS to the reference voltage line RVL. The reference sensing voltage VpreS supplied to the reference voltage line RVL may be applied to the first node N1 of the driving transistor DRT through the turned-on sensing transistor SENT.

Meanwhile, when the voltage at the first node N1 of the driving transistor DRT becomes a voltage state reflecting a sub-pixel characteristic value, the voltage on the reference voltage line RVL, which is equipotential to the first node N1 of the driving transistor DRT, may also become the voltage state reflecting the sub-pixel characteristic value. In this case, the voltage reflecting the sub-pixel characteristic value may be charged to a line capacitor formed on the reference voltage line RVL. That is, when the sensing transistor SENT is turned on, the voltage at the first node N1 of the driving transistor DRT may be the same as the voltage of the reference voltage line, i.e., the voltage charged to the line capacitor formed on the reference voltage line RVL.

When the voltage at the first node N1 of the driving transistor DRT becomes a voltage state reflecting the pixel characteristic value, the sampling switch SAMP is turned on, allowing the connection between the sensing circuitry 300 and the reference voltage line RVL. Consequently, the sensing circuitry 300 senses the voltage of the reference voltage line RVL in the voltage state reflecting the sub-pixel characteristic value. Here, the reference voltage line RVL is also referred to as the sensing line. That is, the sensing circuitry 300 senses the voltage at the first node N1 of the driving transistor DRT.

The sensing circuitry 300 may also sense the potential difference (voltage) formed across the line capacitor Csl connected to the reference voltage line RVL. In this regard, when the sensing circuitry 300 senses the potential difference (voltage) formed across the line capacitor Csl, it may be understood as equivalent to sensing the voltage at the first node N1. In some embodiments, the line capacitor Csl may be formed on the reference voltage line RVL (e.g., a parasitic capacitor) or may be connected to the reference voltage line RVL (e.g., an integrated capacitor).

In the case of sensing the threshold voltage of the driving transistor DRT, the voltage sensed by the sensing circuitry 300 may be a voltage value (Vdata-Vth or Vdata-ΔVth) including the threshold voltage Vth or threshold voltage variation ΔVth of the driving transistor DRT. Meanwhile, in the case of sensing the mobility of the driving transistor DRT, the voltage sensed by the sensing circuitry 300 may be a voltage value for sensing the mobility of the driving transistor DRT.

The sensing circuitry 300 converts the sensed voltage into a digital value and generates and outputs the sensing data Vsen including the converted digital value (sensing value). The sensing data Vsen outputted from the sensing circuitry 300 may be stored in the memory 150 or provided to the timing controller 140.

The timing controller 140 may perform a compensation process using the sensing data Vsen to compensate for sub-pixel characteristic values or characteristic value deviations and store the sensing data Vsen and/or the resultantly generated compensation values in the memory 150.

Here, the changes in characteristic values of the driving transistor DRT may refer to the change in the current sensing data Vsen compared to the previous sensing data Vsen, or the change in the current sensing data Vsen compared to the reference compensation data.

By comparing the characteristic values or changes in the characteristic values between driving transistors DRT, a compensation unit or circuit 330 may determine the deviations in characteristic values among the driving transistors DRT. When the changes in characteristic values of the driving transistor DRT refers to the change in the current sensing data compared to the reference sensing data, it is possible to determine the characteristic values deviations (i.e., sub-pixel luminance deviations) among the driving transistors DRT based on the changes in the characteristic values of the driving transistors DRT.

The characteristic value compensation process may include a threshold voltage compensation process for compensating the threshold voltage of the driving transistor DRT and a mobility compensation process for compensating the mobility of the driving transistor DRT. The timing controller 140 may modify the video data Data through a threshold voltage compensation process or mobility compensation process and supply the modified data to the corresponding source driver integrated circuit SDIC within the data driver 120. Consequently, the source driver integrated circuit SDIC converts the data modified by the timing controller 140 into a data voltage and supplies the data voltage to the corresponding sub-pixel, allowing for actual compensation of sub-pixel characteristic values. The sub-pixel characteristic value compensation helps reduce or prevent luminance deviations among sub-pixels, leading to an improvement in the uniformity of luminance across the display panel 110 and the overall image quality.

Figure 4:
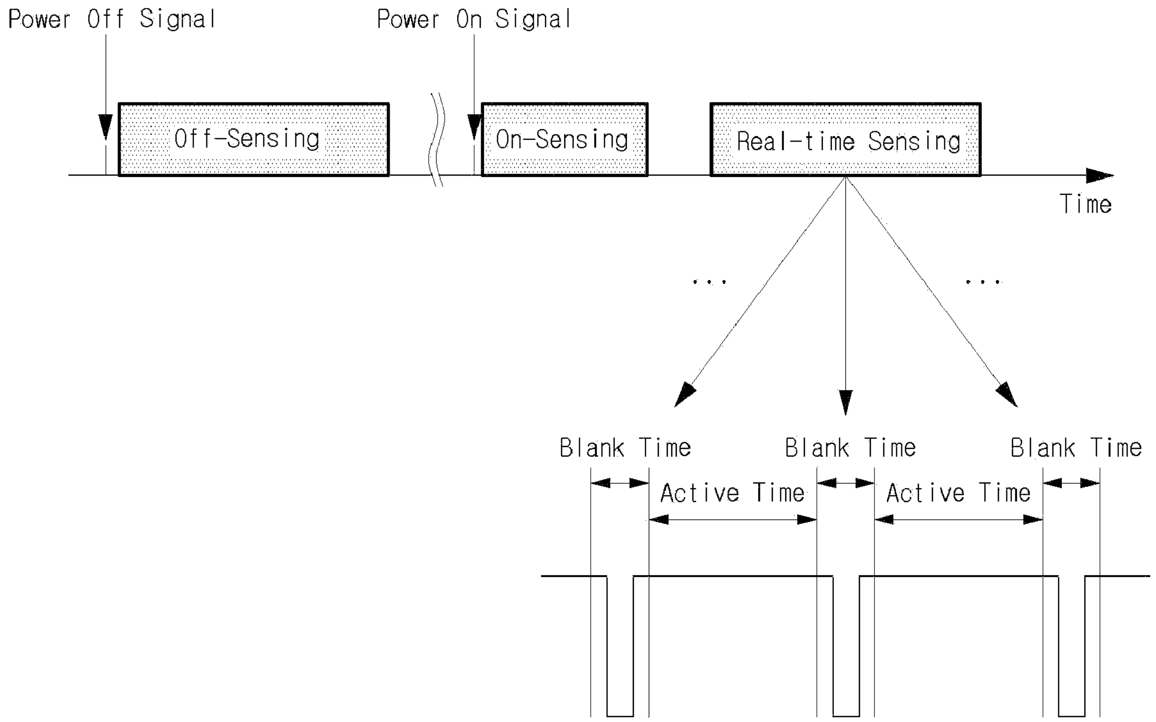
FIG. 4 is a diagram illustrating sensing timing of a display device according to an aspect.

FIG. 4 is a diagram illustrating the sensing timing of a display device 100 according to an aspect.

With reference to FIG. 4, the display device 100 according to an aspect may sense the characteristic values of the circuit components within each of sub-pixels arranged on the display panel 110 upon detection of a power-off signal generated in response to a user input or the like. This sensing process that occurs after the power-off signal is called "off-sensing."

Meanwhile, the display device 100 according to an aspect may sense the characteristic values of circuit components within each sub-pixel upon detection of a power-on signal but before the display driving begins. This sensing process that occurs after the power-on signal and before the display driving is called "on-sensing."

Furthermore, the display device 100 according to an aspect may sense the characteristic values of circuit components within each sub-pixel during the display driving. This sensing process that occurs during the display driving is referred to as "real-time sensing" or "RT sensing." The real-time sensing takes place within each blank time between active times, which is determined by the vertical sync signal.

Figure 5:
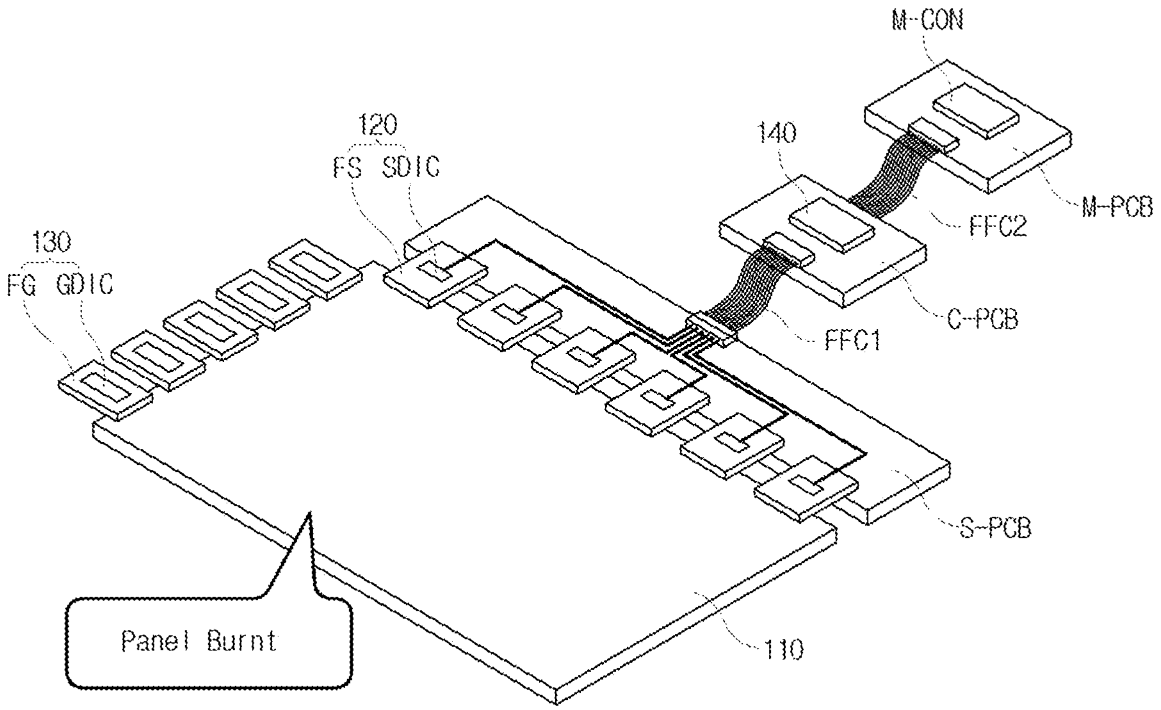
FIG. 5 is a diagram for explaining a panel burnt phenomenon of a display device according to an aspect.

FIG. 5 is a diagram for explaining panel burnt phenomenon of a display device according to an aspect.

With reference to FIG. 5, the data driver 120 may include at least one source driver integrated circuit SDIC to drive a plurality of data lines DL1 to DLm.

Each source driver integrated circuit SDIC may be connected to the bonding pads of the display panel 110 using tape-automated-bonding or chip-on-glass techniques or directly placed on the display panel 110 or, in some cases, integrated within the display panel 110, depending on the specific configuration. Also, each source driver integrated circuit SDIC may be implemented using the chip-on-film (COF) method in which it is mounted on the source-side film FS connected to the display panel 110, as shown in FIG. 5.

Each source driver integrated circuit SDIC may include components such as a shift register, a latch circuit, a digital-to-analog converter, and an output buffer. In some cases, each source driver integrated circuit SDIC may include an analog-to-digital converter.

The gate driver 130 may include at least one gate driver integrated circuit GDIC to drive a plurality of gate lines GL1 to GLn. Each gate driver integrated circuit GDIC may be connected to the bonding pad of the display panel 110 using tape-automated bonding or chip-on-glass techniques or directly placed on the display panel 110 by being implemented as gate-in-panel (GIP) type or, in some cases, integrated within the display panel 110. Furthermore, each gate driver integrated circuit GDIC may be implemented using the chip-on-film method in which it is mounted on the gate-side film FG connected to the display panel 110, as shown in FIG. 5. Each gate driver integrated circuit GDIC may include components such as a shift register and a level shifter.

In an aspect, the display device 100 may include at least one source printed circuit board S-PCB for the circuit connection of at least one source driver integrated circuit SDIC and a control printed circuit board C-PCB for mounting control components and various electrical devices. The at least one source printed circuit board S-PCB may accommodate at least one source driver integrated circuit SDIC or may be connected to the source-side film FS where at least one source driver integrated circuit SDIC is mounted. The control printed circuit board C-PCB may include a timing controller 140 controlling the operations of the data driver 120 and gate driver 130 and a power controller supplying various voltages or currents to the display panel 110, data driver 120, and gate driver 130 or controlling the supply of various voltages or currents. The at least one source printed circuit board S-PCB and the control printed circuit board C-PCB may be circuitally connected through at least one flexible flat cable FFC1.

The display device 100 may also include a main printed circuit board M-PCB accommodating a main controller M-CON and other components in addition to the at least one source printed circuit board S-PCB and the control printed circuit board C-PCB. The main printed circuit board M-PCB may be connected to the control printed circuit board C-PCB through at least one flexible flat cable FFC2. The at least one of the source printed circuit board S-PCB, the control printed circuit board C-PCB and the main printed circuit board M-PCB may be integrated into a single printed circuit board.

In an aspect, the display panel 110 may experience panel burnt phenomena caused by various types of defects. The panel burnt phenomenon may occur due to various defects such as short or open circuits in the signal lines, DL, GL, DVL, RVL, gate voltage wiring, etc., located on the display panel 110, bonding errors between the display panel 110 and the gate-side film FG or source-side film FS, loose connection of the flexible flat cable FFC1 causing electrical connection issues between the source printed circuit board S-PCB and the control printed circuit board C-PCB, and loose connection of the flexible flat cable FFC2 causing electrical connection issues between the control printed circuit board C-PCB and the main printed circuit board M-PCB.

In the presence of such defects, the display panel 110 may experience panel burnt phenomenon and may not function properly. Moreover, the display device 100 may malfunction, and in extreme cases, even lead to fire incidents.

Therefore, it is beneficial to proactively detect the defects that lead to panel burnt phenomenon before the occurrence of panel burnt phenomenon. This facilitates prompt and suitable response measures in the event of a defect occurrence.

In an aspect, burnt detection may be performed during the on-sensing process, off-sensing process, and/or real-time sensing process. In an alternative aspect, burnt detection may be performed within the active time of one frame during display driving.

Hereinafter, a detailed description is made of the method for detecting panel burnt within the active time.

Figure 6:
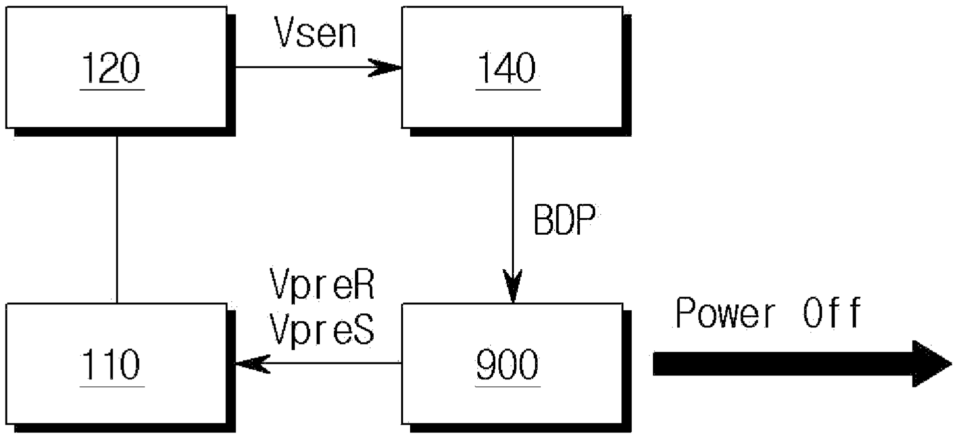
FIG. 6 is a diagram illustrating a connection relationship between a data driver, a timing controller, a power controller, and a display panel according to an aspect.

FIG. 6 is a diagram illustrating a connection relationship between a data driver, a timing controller, a power controller, and a display panel according to an aspect.

With reference to FIG. 6, a display device according to an aspect includes a timing controller 140, a power controller 900, a data driver 120, and a display panel 110.

The data driver 120 may perform sensing for detecting burnt phenomena the display panel 110 based on a control signal received from the timing controller 140. In an aspect, the data driver 120 may detect defects such as panel burnt during the active time as shown in FIG. 4. When defect detection is performed during the active time, the length of the blank time within may be minimized or reduced within one frame. A method for detecting burnt to minimize or reduce the length of the blank time is described with reference to FIGS. 7 to 10.

The timing controller 140 may determine the panel defect based on the sensing data Vsen received from the data driver 120. Upon determining the occurrence of a panel defect, the timing controller 140 may initiate the corresponding burnt mitigation sequence.

For example, the timing controller 140 may generate and output a burnt detection and protection signal (BDP). In an aspect, the timing controller 140 may output the BDP to power controller 900. The timing controller 140 may also stop the output of control signals to the data driver 120 and gate driver 130 to halt their operation.

When the power controller 900 receives the BDP from the timing controller 140, it may perform power-off processing. For example, the power controller 900 may stop the generation of drive voltages supplied to the display panel 110, data driver 120, and gate driver 130. Additionally, the power controller 900 may output a power-off signal to an external host to perform a power-off sequence through the host.

Figure 7:
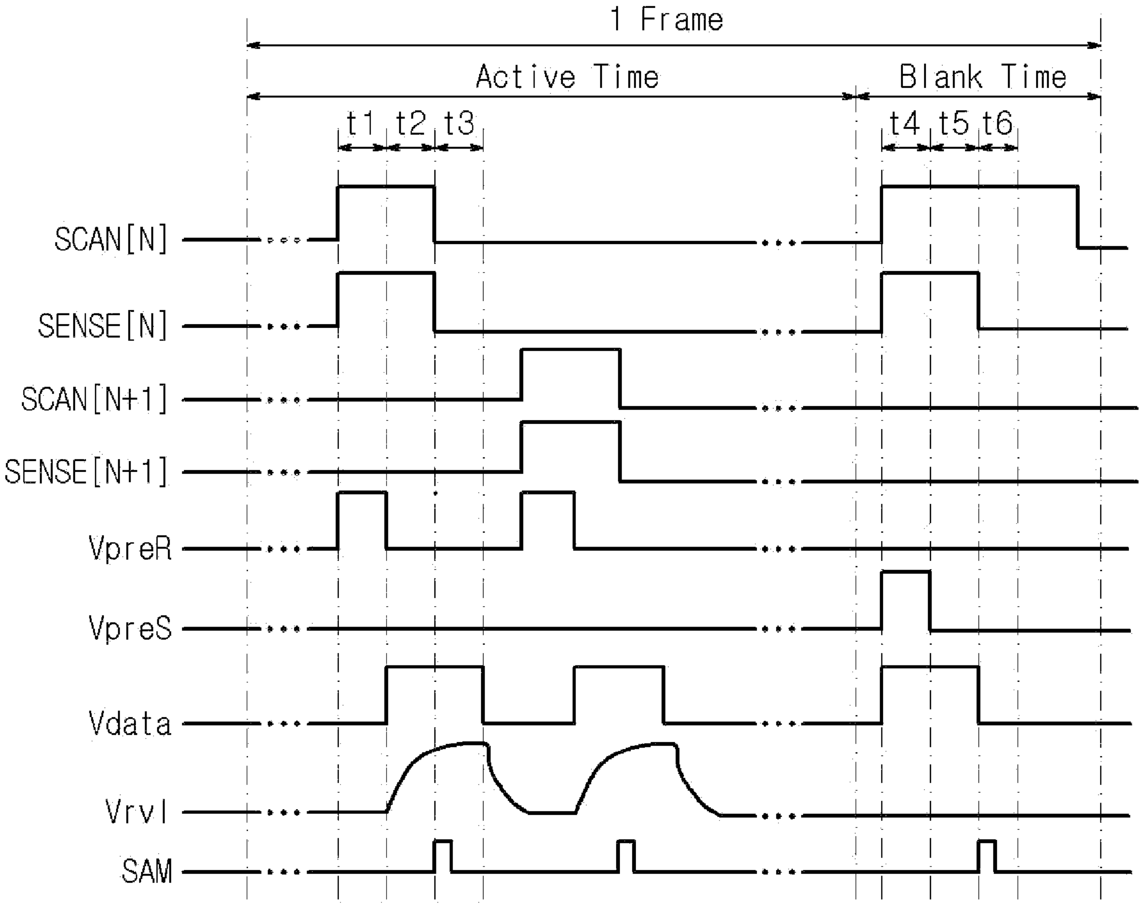
FIG. 7 is a diagram for explaining a burnt detection operation according to an aspect.
Figure 8:
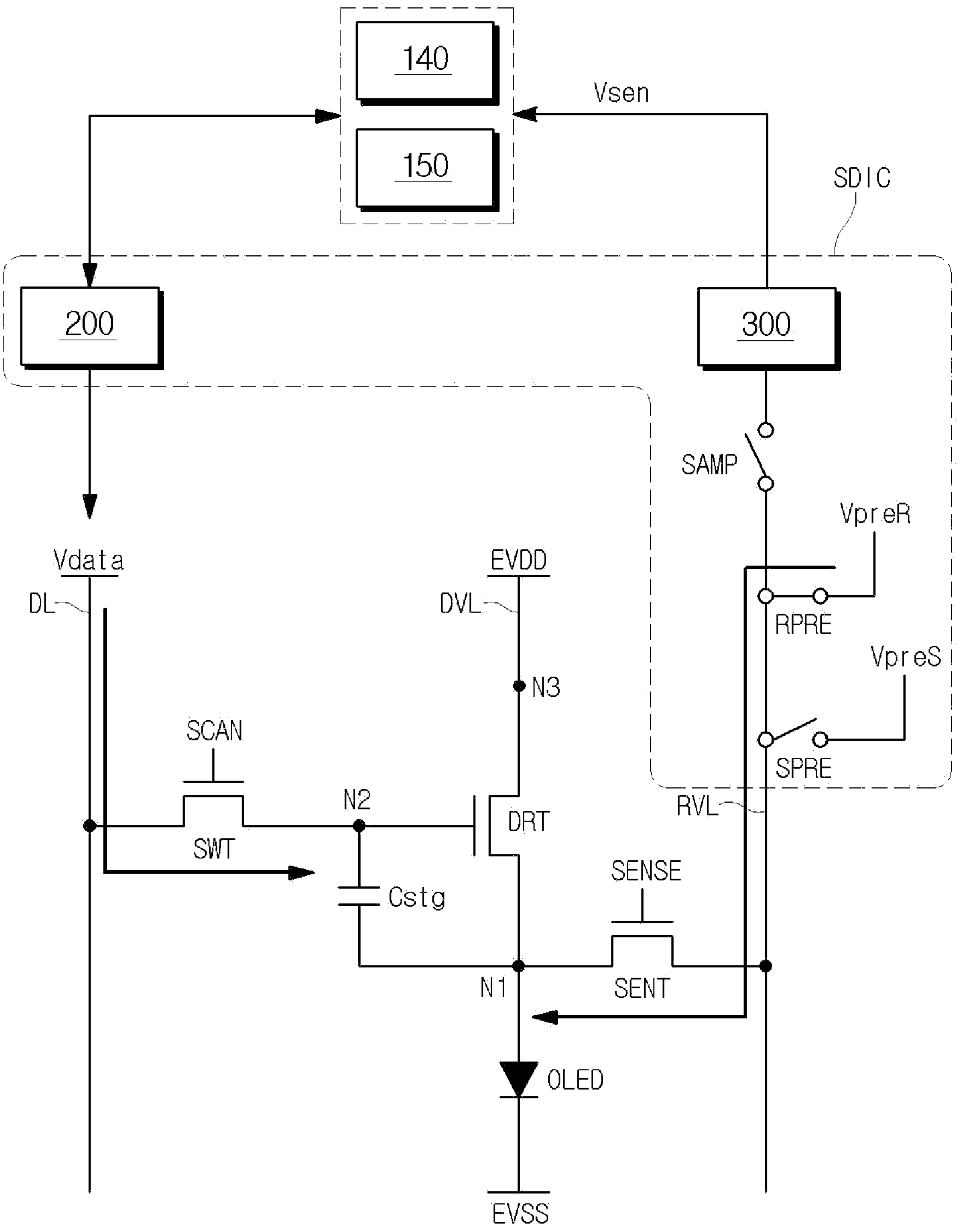
FIGS. 8 to 10 are diagrams illustrating driving states of a sub-pixel within an active time.
Figure 9:
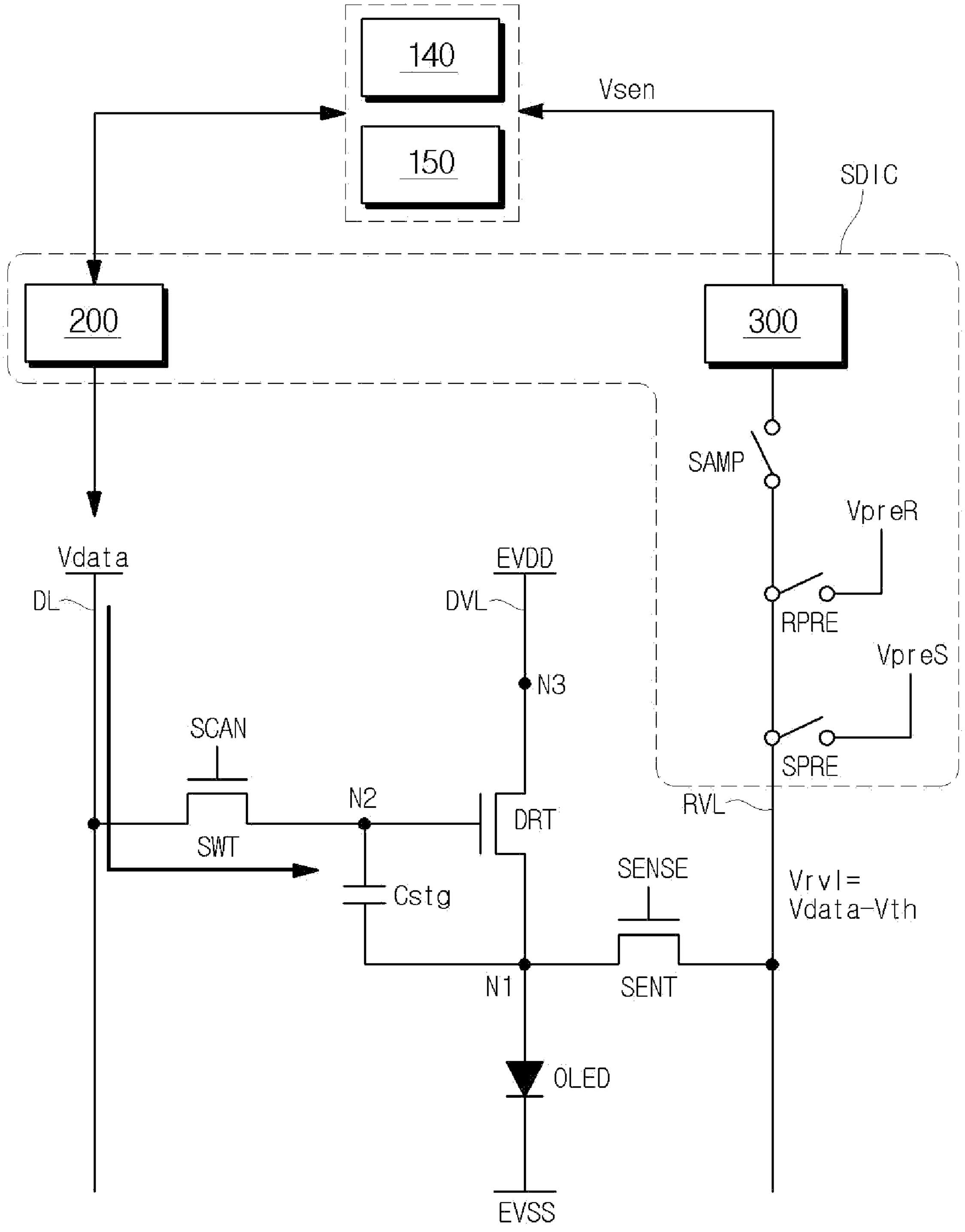
Figure 10:
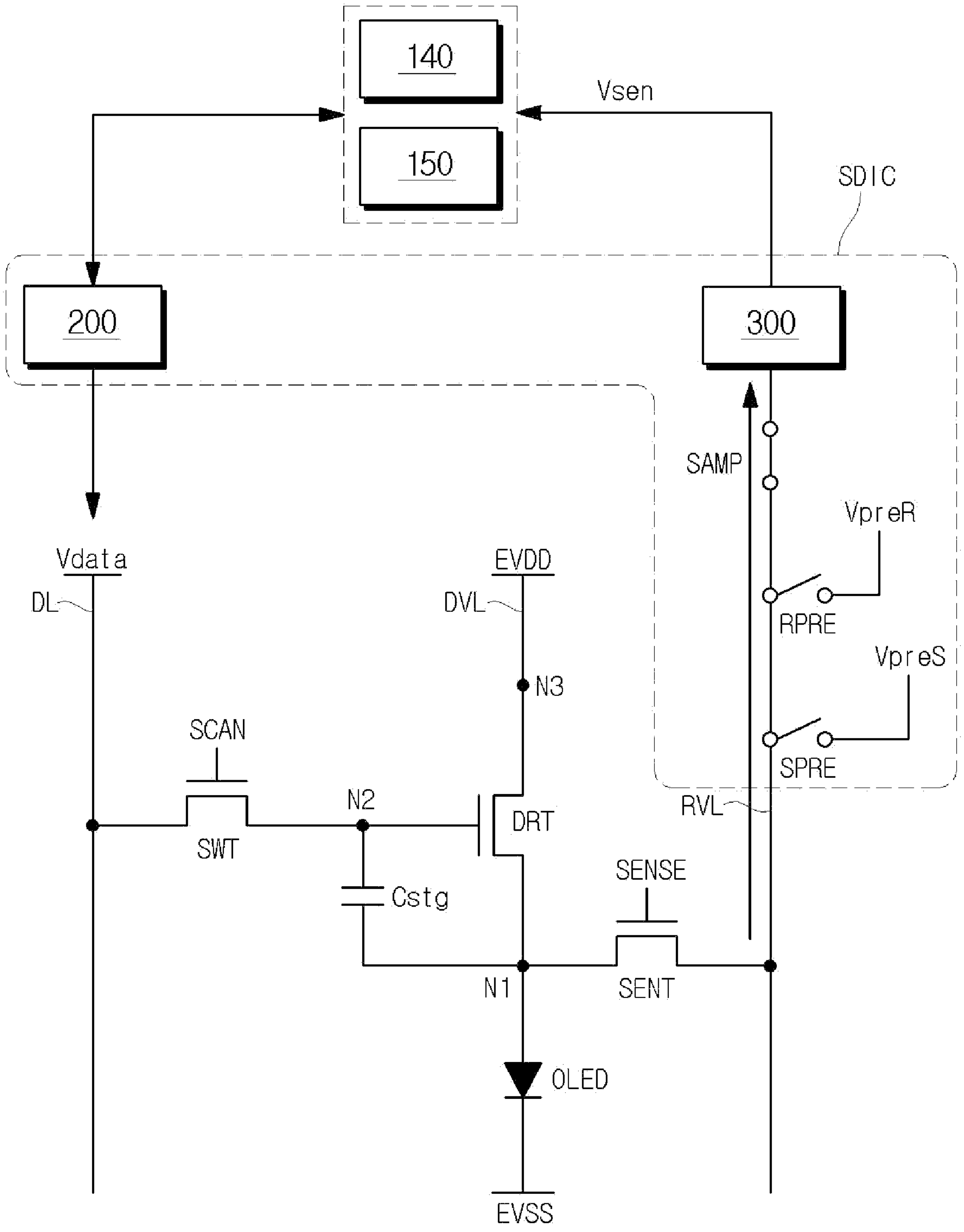

FIG. 7 is a diagram illustrating a burnt detection operation according to an aspect. FIGS. 8 to 10 are diagrams illustrating driving states of a sub-pixel within an active time.

With reference to FIG. 7, display driving may be performed on a frame-by-frame basis, and one frame may include an active time for displaying the image and a blank time following the active time. The active time refers to the period during which the data driver 120 outputs data voltage Vdata through a plurality of data lines DL1 to DLm, while the gate driver 130 sequentially drives a plurality gate lines GL1 to GLn. During the blank time, real-time sensing may be performed to sense the characteristic values of sub-pixels SP.

The active time includes a first period t1 for programming the data voltage Vdata to the sub-pixel SP, a second period t2 for tracking the voltage at the second node N2 of the driving transistor DRT, and a third period t3 for sensing the voltage of the reference voltage line RVL.

With reference to FIG. 8, during the first period t1, a turn-on level scan signal SCAN may be applied to the switching transistor SWT, and a turn-on level sensing signal SENSE may be applied to the sensing transistor SENT. In addition, during the first period t1, the data voltage Vdata for image display may be applied through the data line DL, and the first switch RPRE may be turned on to apply the reference display voltage VpreR through the reference voltage line RVL.

As a result, the switching transistor SWT may be turned on, allowing the data voltage Vdata to be applied to the second node N2, and the sensing transistor SENT may be turned on, allowing the reference display voltage VpreR to be applied to the first node N1. The storage capacitor Cstg may store a voltage corresponding to the difference between the data voltage Vdata and the reference display voltage VpreR. After the first period t1, during the remaining active time including the third period t3 when the switching transistor SWT and the sensing transistor SENT are turned off, the organic light-emitting diode OLED may emit light with luminance corresponding to the voltage stored in the storage capacitor Cstg.

With reference to FIG. 9, when the application of the reference display voltage VpreR is interrupted during the second period t2, the reference voltage line RVL becomes floating. During the second period t2, the switching transistor SWT and the sensing transistor SENT remain in the turned-on state.

The first node N1 in the floating state gradually increases in voltage and eventually saturates. The saturated voltage of the first node N1 of the driving transistor DRT may correspond in magnitude to the data voltage Vdata. That is, once the data voltage Vdata is determined, the target value (target voltage) of the saturation voltage is predetermined or selected. For example, the saturation voltage of the first node N1 may correspond to the difference between the data voltage Vdata and the threshold voltage Vth of the driving transistor DRT.

Here, the voltage of the first node N1 is equal to the voltage Vrvl of the reference voltage line RVL, and the increased voltage Vrvl of the reference voltage line RVL may be stored identically in the line capacitor Csl.

When the voltage of the second node reaches saturation, sampling may be performed. With reference to FIG. 10, during the third period t3, the sampling switch SAMP may be turned on at least once, allowing the sensing circuitry 300 to be connected to the reference voltage line RVL. As a result, the voltage Vrvl of the reference voltage line RVL may be transmitted to the sensing circuitry 300.

The sensing circuitry 300 may detect panel defects based on the electrical signal of the sensed reference voltage line RVL, e.g., the voltage Vrvl. In the case where there are no defects, such as burnt, in the corresponding sub-pixel SP, the sensed voltage Vrvl of the reference voltage line RVL may be practically equal to the predetermined or selected target voltage. On the other hand, when a burnt defect occurs in the corresponding sub-pixel SP, current leakage occurs from the reference voltage line RVL, causing the sensing voltage Vrvl to be lower than the target voltage. Therefore, the sensing circuitry 300 compares the sensing voltage Vrvl with the target voltage of the saturated voltage and may determine that a defect, such as panel burnt, has occurred in the corresponding sub-pixel SP when the difference between the sensing voltage Vrvl and the target voltage of the saturated voltage is greater than a certain threshold value.

Such burnt detection may be performed on a per sub-pixel line basis. For example, a single sensing circuitry 300 may determine that a burnt defect has occurred on the display panel 110 when the sensing voltage deviates by more than the threshold value from the target voltage of the saturated voltage in a predetermined or selected number of sub-pixels SP on a single sub-pixel line.

Furthermore, burnt detection may only be performed on a predetermined or selected set of sub-pixel lines. Considering it is typical that panel burnt occurs frequently in the edge areas of the panel, especially the top and bottom edges, burnt detection may be limited to the first sub-pixel line and the last sub-pixel line among the plurality of sub-pixel lines. However, this aspect is not limited thereto.

In one aspect, the sensing circuitry 300 may sample the voltage Vrvl of the reference voltage line RVL in real-time within the active time and determine the occurrence of defects based on the sampled sensing voltage Vrvl.

In another aspect, the sensing circuitry 300 may sample and store the sensed voltage Vrvl during the active time and compare the stored sampled sensing voltage with the target voltage of the saturated voltage during the blank time to detect defects. In this aspect, the sampled sensing voltage may be stored in the line capacitor and/or DAC capacitor of the sensing circuitry 300.

Meanwhile, as depicted in FIG. 7, the blank time includes a fourth period t4 for initializing the voltages of the first node N1 and the second node N2 of the driving transistor DRT, a fifth period t5 for tracking the voltage of the second node N2, and a sixth period t6 for sensing the voltage of the reference voltage line RVL.

During the fourth period t4, a scan signal SCAN at the turn-on level is applied to the switching transistor SWT, and a sensing signal SENSE at the turn-on level is applied to a sensing transistor SENT. In addition, during the fourth period t4, a data voltage Vdata for sensing is applied through the data line DL, and the second switch SPRE is turned on, allowing the reference voltage VpreS for sensing to be applied through the reference voltage line RVL.

During the fifth period t5, the application of the sensing reference voltage VpreS is interrupted, causing the first node N1 of the driving transistor DRT to float. As a result, the voltage of the first node N1 of the driving transistor DRT increases.

The voltage at the first node N1 of the driving transistor DRT increases until it saturates, gradually reducing the magnitude of the voltage increase. The saturated voltage of the first node N1 of the driving transistor DRT may correspond to the difference between the sensing data voltage Vdata and the threshold voltage Vth.

Once the voltage at the first node N1 of the driving transistor DRT reaches saturation, the sampling switch SAMP may be turned on at least once during the sixth period t6 to sense the saturated voltage at the first node N1 of the driving transistor DRT.

The sensing circuitry 300 converts the sensed voltage into sensing data Vsen and transmits it to the timing controller 140, which may perform compensation processes based on the sensing data Vsen.

In this aspect, the voltage sensing for burnt defect detection and the sampling of the sensing voltage are performed within the active time other than the blank time during the display driving of an image. Therefore, it may reduce the relative duration of the blank time and increase the active time, enabling fast driving of high-brightness display devices.

Figure 11:
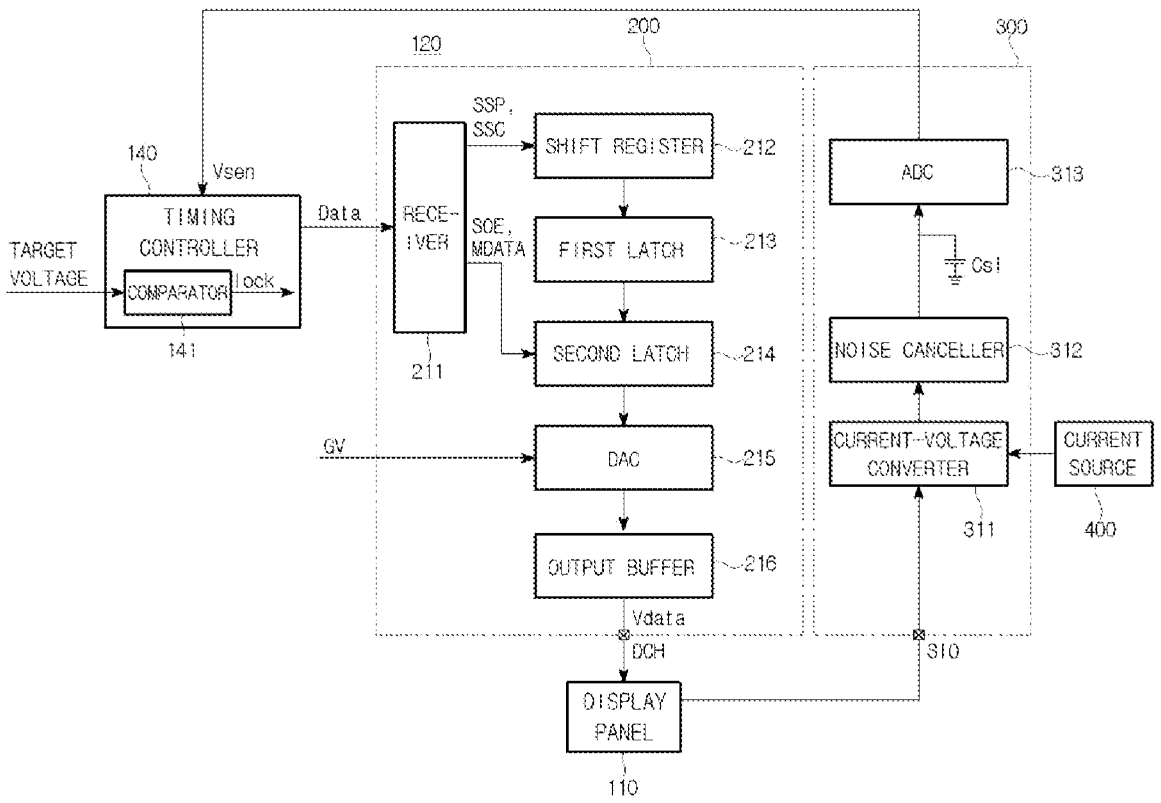
FIG. 11 is a block diagram illustrating a configuration of a data driver according to an aspect.

FIG. 11 is a block diagram illustrating a configuration of a data driver according to an aspect.

With reference to FIG. 11, the data driver 120 includes a driving circuitry 200 and a sensing circuitry 300.

The driving circuitry 200 includes a receiver 211, a shift register 212, a first latch 213, a second latch 214, a digital-to-analog converter (DAC) 215, and an output buffer 216.

The receiver 211 may receive signals supplied through various interface technologies such as LVDS interface, EPI, DisplayPort (DP), or Embedded DP (eDP) interfaces from the timing controller 140 and recover video data Data and source control signals SSP, SSC, and SOE from the received signals for output. In an aspect, the video data MDATA received through the receiver 211 may be the video data compensated for the gain values through sub-pixel sensing. The source control signals may include a source start pulse signal SSP, a source sampling clock signal SSC, and a source output enable signal SOE. The source start pulse SSP is responsible for controlling the starting point of data sampling in the source driver IC. The source sampling clock SSC is a clock signal responsible for controlling the data sampling operation in the source drive IC based on the rising or falling edge. The source output enable signal SOE is responsible for controlling the output of the source drive IC.

The receiver 211 may be configured to include a serial-parallel converter. In an aspect, the receiver 211 may receive a control packet form the timing controller 140 through the EPI interface or the like and obtain control information for the overdriving sensing drive from the control packet.

The shift register 212 responds to the source start pulse SSP and source sampling clock SSC provided by the timing controller 140 to generate sampling signals.

The first latch 213 latches the digital video data Data in response to the sampling signals input sequentially from the shift register 212 and outputs the latched vide data in parallel. The first latch 213 simultaneously outputs the video data Data sampled on one horizontal line in response to the source output enable signal SOE.

The second latch 214 latches the data input from the first latch 213 and outputs the latched video data Data simultaneously with the second latches of other source drive ICs during the logic low period of the source output enable signal SOE. In various aspects, there may be only one latch provided.

The DAC 215 receives gamma gradation voltages GV and converts the video data MDATA of one horizontal line into data voltages Vdata based on gamma gradation voltages GV. That is, the DAC 215 may convert the digital video data MDATA into analog data voltages Vdata. The output buffer 216 supplies the data voltages Vdata output from the DAC 215 to the data line DL through a data channel DCH according to the source output enable signal SOE.

The sensing circuitry 300 includes a current-voltage converter 311, a noise canceler 312, and an ADC 313.

The current-voltage converter 311 samples the current input through a sensing channel SIO from the display panel 110 or the current source 400 by converting the current into a voltage through current integration, producing a voltage sensing value. The noise canceler 312 cancels noise that may be introduced through the sampled sensing value from adjacent channels and outputs the resulting value. Here, the current-voltage converter 311 or the combination of the current-voltage converter 311 and the noise canceler 312 may be referred to as a sampling unit or circuit for sampling the sensing voltage of the reference voltage line RVL.

The ADC 313 converts the sampled sensing value supplied from the noise canceler 312 or the sampled sensing value bypassing the noise canceler 312 from the current-voltage converter 311 into digital data and outputs it as sensing data Vsen to the timing controller 140.

The sensing circuitry 300 may be provided with a line capacitor Csl. The line capacitor Csl may be provided at the input terminal of the ADC 313 or within the ADC 313. The line capacitor Csl temporarily stores the sampled sensing value obtained through the current-voltage converter 311 and may input the stored sampled sensing value to the ADC 313 when the ADC 313 operates. For example, the sensing circuitry 300 may sample the voltage of the reference voltage line RVL upon the sampling switch SAMP being turned on (e.g., during a period in which the sampling switch SAMP is turned on) during the active time within one frame, and it may convert the sampled voltage into a digital value via the ADC 313 during the subsequent blank time.

Meanwhile, the current source 400 is depicted as being provided outside the data driver 120 in the illustrated aspect, but this aspect is not limited thereto. That is, in an alternative aspect, the current source 400 may be located within the data driver 120.

The timing controller 140 may determine the defect such as panel burnt based on the sensing data Vsen received from the ADC 313. For this purpose, the timing controller 140 may include a comparator 141. The comparator 141 may compare the voltage of the reference voltage line RVL, which is sensed during the active time, with a predetermined or selected target voltage. The target voltage may be determined based on the video display data voltage Vdata applied to the sub-pixel SP during the active time and a predetermined or selected threshold voltage Vth, it may be prestored in memory 150.

The comparator 141 may output a first-level lock signal (e.g., a high-level lock signal) in response to the difference between the sensing voltage obtained from the sensing data Vsen and the predetermined or selected target voltage being smaller than a predetermined or selected threshold value, and it may output a second-level lock signal (e.g., a low-level lock signal) in response to the difference being larger than predetermined or selected threshold value. The timing controller 140 perform the burnt defect mitigation sequence in response to the lock signal (e.g., the low-level lock signal) generated by the comparator 141.

Figure 12:
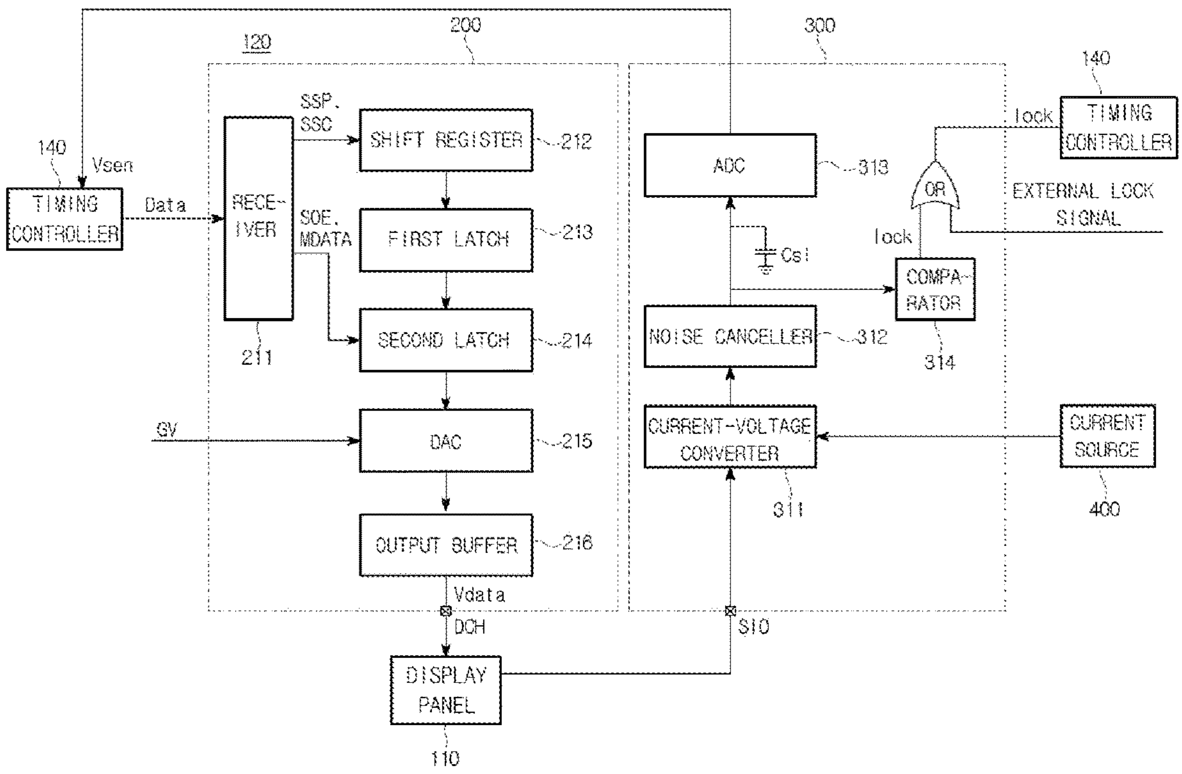
FIG. 12 is a block diagram illustrating a configuration of a data driver according to another aspect.

FIG. 12 is a block diagram illustrating a configuration of a data driver according to another aspect.

With reference to FIG. 12, a comparator 314 may be provided within the sensing circuitry 300 of the data driver 120. The comparator 314 is composed of or includes analog hardware and receives the analog sampling voltage before it is digitally converted by the ADC 313.

The comparator 314 may receive the sensing voltage of the reference voltage line RVL, which is sensed during the active time, and a predetermined or selected target voltage. The comparator 314 may output a first-level lock signal (e.g., a high-level lock signal) in response to the difference between the sensing voltage and the predetermined or selected target voltage being less than a predetermined or selected threshold value, and it may output a second-level lock signal (e.g., a low-level lock signal) in response to the difference being greater than the predetermined or selected threshold value.

An OR gate may be connected to the output terminal of the comparator 314. The OR gate is configured to receive both the lock signal input from the outside and the lock signal outputted by the comparator 314. The lock signal input from the outside may be input as a second-level lock signal (e.g., a low-level lock signal) when defects in other components, such as overcurrent in the gate driver 130 or cracks occurring at the edges of the display panel 110, are detected.

When a second-level lock signal is inputted from the outside due to the aforementioned defects or generated by the comparator 314 due to the burnt defect detection, the OR gate outputs the second-level lock signal (e.g., a low-level lock signal) to the timing controller 140 via the EPI interface. The OR gate may transmit the lock signal (e.g., a low-level lock signal) to the timing controller 140 through the EPI interface.

Upon detecting the lock signal (e.g., a low-level lock signal), the timing controller 140 determines that a panel burnt defect has occurred and may perform the defect mitigation sequence.

The display devices and driving methods thereof according to aspects are capable of reducing burnt defect detection time and minimizing the blank time by detecting burnt defects of the display panel during the display driving of images.

The display devices and driving methods thereof according to aspects are capable of increasing the driving frequencies of the display by reducing the blank time in a frame, allowing for the fast operation of high-luminance display devices.

The display devices and driving methods thereof according to aspects are capable of detecting burnt defects in real time during display operation, allowing for quick response and preventing additional damage.

Although the aspects of the present disclosure have been described with reference to the accompanying drawings, it will be understood by those skilled in the art that the technical configuration of this disclosure may be implemented in other specific forms without changing the technical idea or features of this disclosure. Therefore, it should be understood that the aspects described above are examples and not limited in all respects. In addition, it should be understood that all modifications or variations derived from the meaning and scope of the claims and their equivalent concept are included within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of sub-pixels, the display panel configured to display an image in units of frames, each of the plurality of sub-pixels including a first transistor connected to be controlled by a scan signal and a second transistor connected to be controlled by a sensing signal;

a data driver including:

driving circuitry that, in operation, applies a data voltage to a sub-pixel of the plurality of sub-pixels during an active time of displaying a frame of the units of frames of the image; and sensing circuitry including a sampling switch controlling a connection between the plurality of sub-pixels and the sensing circuitry and configured to, in operation, sense the sub-pixel during the active time; and a timing controller that, in operation, detects a defect of the display panel based on comparing a sensing result of the sensing circuitry with a target voltage selected based on a data voltage applied during the active time, wherein the active time includes:

a first period during which the scan signal at a first turn-on level and the sensing signal at a second turn-on level, the data voltage, and a reference display voltage are applied to the sub-pixel;

a second period, subsequent to the first period, during which the scan signal and the sensing signal remain on respective turn-on levels, application of the reference display voltage is interrupted; and a third period, subsequent to the second period, during which the scan signal at a first turn-off level and the sensing signal at a second turn-off level are applied to the sub-pixel and the sampling switch is turned on.

2. The display device of claim 1, wherein the sensing circuitry comprises a sampling switch that controls a connection between the sub-pixel and the sensing circuitry, and the timing controller, in operation, turns on the sampling switch at least once during the active time.

3. The display device of claim 2, wherein the sensing circuitry comprises:

a sampling circuit that, in operation, during a period in which the sampling switch is turned on, samples an electrical signal as a sensing voltage; and an analog-to-digital converter that, in operation, outputs digital data converted from the sensing voltage.

4. The display device of claim 3, wherein the sensing circuitry further comprises a line capacitor that stores the sensing voltage sampled during the active time, and the analog-to-digital converter converts the sensing voltage stored in the line capacitor to the digital data during a blank time following the active time.

5. The display device of claim 3, further comprising a comparator that, in operation, compares the sensing voltage with the target voltage.

6. The display device of claim 5, wherein the comparator is in the timing controller or the sensing circuitry.

7. The display device of claim 5, wherein the comparator compares the sensing voltage with the selected target voltage and outputs a lock signal based on a difference between the sensing voltage and the selected target voltage being greater than a threshold value.

8. The display device of claim 7, wherein the sensing circuitry further comprises:

the comparator; and an OR gate configured to receive the lock signal output from the comparator and a second lock signal associated with a defect being detected in the display panel.

9. The display device of claim 2, wherein the timing controller provides video data compensated based on a characteristic value of the sub-pixel sensed during a blank time following the active time to the driving circuitry.

10. The display device of claim 2, further comprising:

a power controller that, in operation, applies a reference voltage to the sub-pixel; and a gate driver that, in operation, applies a scan signal and a sensing signal to the sub-pixel.

11. A method, comprising:

providing a display device including a display panel having a plurality of sub-pixels therein;

applying data voltage to a sub-pixel of the plurality of sub-pixels by driving circuitry of a data driver, the data voltage being applied to the sub-pixel during an active time of one frame of displaying an image;

sensing an electrical signal output from the sub-pixel by sensing circuitry of the data driver, the electrical signal output being sampled as a sensing voltage by turning on a sampling switch during the active time, the sampling switch being configured to switch a connection between the sub-pixel and the sensing circuitry; and comparing the sensing voltage with a target voltage selected based on the data voltage applied during the active time.

12. The method of claim 11, further comprising:

sensing a characteristic value of the sub-pixel during a blank time following the active time; and providing video data compensated based on the characteristic value to the driving circuitry.

13. The method of claim 11, further comprising:

storing, by the sensing circuitry, the sampled sensing voltage in a line capacitor of the sensing circuitry during the active time; and converting, by the sensing circuitry, the sampled sensing voltage stored in the sensing circuitry into digital data during a blank time following the active time.

14. The method of claim 11, further comprising:

outputting a lock signal based on a difference between the sensing voltage and the selected target voltage being greater than a threshold value.

15. The method of claim 14, wherein the selected target voltage is determined in correspondence to the data voltage applied during the active time.

16. A display device, comprising:

a display panel having a plurality of sub-pixels, the display panel configured to display images in units of frames, each frame including an active time followed by a blank time;

a reference voltage line associated with the sub-pixel;

a data driver including:

driving circuitry that, in operation, outputs a data voltage to a data line coupled to the sub-pixel; and sensing circuitry that, in operation, generates sensing data by sampling an electrical signal on the reference voltage line during a third period in which the reference voltage line is electrically floating;

a power controller that, in operation, generates a first reference voltage during the active time and generates a second reference voltage during the blank time; and a timing controller that, in operation, detects a defect of the display panel based on the sensing data.

17. The display device of claim 16, wherein:

the sub-pixel includes:

an organic light-emitting diode;

a driving transistor coupled to the organic light-emitting diode;

a switching transistor coupled to the data line and a gate of the driving transistor; and a sensing transistor coupled to the reference voltage line and a source of the driving transistor;

the display device further comprises a gate driver that, in operation, generates a scan signal applied to the switching transistor and a sensing signal applied to the sensing transistor; and the data driver, in operation:

electrically connects the data line to the driving transistor by turning on the switching transistor in a first period and a second period of the active time that precede the third period;

electrically connects the reference voltage line to the driving transistor by turning on the sensing transistor in the first period and the second period;

applies the first reference voltage generated by the power controller to the reference voltage line during the first period; and electrically isolates the reference voltage line from the power controller during the second period.

18. The display device of claim 17, wherein:

the sensing circuitry comprises an analog-to-digital converter (ADC); and the sensing circuitry, in operation:

stores the sampled electrical signal sampled during the third period as a sensing voltage; and the analog-to-digital converter converts the sensing voltage to the sensing data during a fourth period of the blank time that follows the third period of the active time.

* * * * *